(12) United States Patent
Lim

(10) Patent No.: US 11,365,789 B2
(45) Date of Patent: Jun. 21, 2022

(54) SERVO CYLINDER

(71) Applicant: SEJIN-IGB CO., LTD., Chungcheongnam-do (KR)

(72) Inventor: Sun Ho Lim, Chungcheongnam-do (KR)

(73) Assignee: SEJIN-IGB CO., LTD., Chungcheongnam-do (KR)

(*) Notice: Subject to any disclaimer, the term of this patent is extended or adjusted under 35 U.S.C. 154(b) by 310 days.

(21) Appl. No.: 16/607,477

(22) PCT Filed: Jan. 23, 2018

(86) PCT No.: PCT/KR2018/000972
§ 371 (c)(1),
(2) Date: Oct. 23, 2019

(87) PCT Pub. No.: WO2181/199436
PCT Pub. Date: Nov. 1, 2018

(65) Prior Publication Data
US 2020/0141474 A1 May 7, 2020

(30) Foreign Application Priority Data
Apr. 26, 2017 (KR) .................. 10-2017-0053571

(51) Int. Cl.
*F16H 25/24* (2006.01)
*F16H 25/20* (2006.01)

(52) U.S. Cl.
CPC ..... *F16H 25/20* (2013.01); *F16H 2025/2062* (2013.01); *F16H 2025/2087* (2013.01)

(58) Field of Classification Search
CPC ............. F16H 25/20; F16H 2025/2062; F16H 2025/2087
See application file for complete search history.

(56) References Cited

U.S. PATENT DOCUMENTS

2005/0253469 A1* 11/2005 Hochhalter ............ H02K 11/21
310/80
2006/0102697 A1* 5/2006 Nagai .................. F16H 25/2021
228/101
(Continued)

FOREIGN PATENT DOCUMENTS

DE 102009018356 A1 10/2009
JP 2003083400 A 3/2003
(Continued)

OTHER PUBLICATIONS

Extended European Search Report dated Mar. 16, 2020.

*Primary Examiner* — Randell J Krug
(74) *Attorney, Agent, or Firm* — Berenato & White, LLC

(57) ABSTRACT

Provided is a servo cylinder. The servo cylinder includes a reducer comprising a reducer main body connected to a motor and a speed reduction output part provided in the reducer main body, the speed reduction output part outputting power from the motor by reducing a rotation speed and increasing torque; a ball screw coupled to the speed reduction output part inside the reducer when one end portion region of the ball screw is inserted into the reducer, the ball screw performing a rotational motion by the speed reduction output part; and a motion conversion output part connected to the ball screw and converting the rotational motion of the ball screw to a linear motion and outputting a converted motion.

14 Claims, 15 Drawing Sheets

(56) References Cited

U.S. PATENT DOCUMENTS

| | | | | |
|---|---|---|---|---|
| 2011/0234021 A1* | 9/2011 | Eckstein | ............ | H02K 41/031 |
| | | | | 310/12.31 |
| 2015/0240924 A1* | 8/2015 | Lee | ............ | F16C 35/073 |
| | | | | 74/89.36 |

FOREIGN PATENT DOCUMENTS

| | | | | |
|---|---|---|---|---|
| JP | 2005036899 A | | 2/2005 | |
| JP | 2009156415 A | | 7/2009 | |
| JP | 2015040571 A | * | 3/2015 | ............ F16H 25/20 |
| JP | 2015040571 A | | 3/2015 | |
| KR | 101313089 B1 | | 10/2013 | |
| KR | 101612428 B1 | | 4/2016 | |

* cited by examiner

SERVO CYLINDER

CROSS-REFERENCE TO RELATED APPLICATIONS AND CLAIM TO PRIORITY

This application is a national stage application of International Application No. PCT/KR2018/000972 filed Jan. 23, 2018, which claims priority to application number 10-2017-0053571 filed Apr. 26, 2017 in the Republic of Korea, the disclosures of which are incorporated herein by reference and to which priority is claimed.

FIELD OF THE INVENTION

The inventive concept relates to a servo cylinder, and more particularly, to a servo cylinder which may reduce the total length of equipment with respect to the same stroke by employing an internal ball-screw coupling structure in which one end portion of a ball screw is coupled to a reducer inside the reducer, unlike the related art, and may also implement compact equipment by simplifying the structure thereof.

BACKGROUND OF THE INVENTION

Servo cylinders are one type of electric actuators that convert a rotational motion of a motor to a linear motion.

Air cylinders are apparatuses used where a linear motion is needed and are currently being used in various industrial sites. However, the structure of a servo cylinder is simple comparing with an air cylinder, and the speed and the torque of a servo cylinder are quite high due to the use of a servo motor or an electric motor, which remarkably facilitates position control.

For the above reasons, servo cylinders are widely applied to robots for a logistics system of an automobile assembly line or a production system of industrial automation. For example, when a robot arm performs a reciprocating linear motion by a predetermined stroke distance, a servo cylinder may be employed at such a position.

FIG. 1 is a partial cross-sectional view of a general.

Referring to the drawing, the servo cylinder 1 according to the related art has a structure in which a ball screw 20 is connected to a reducer 10 that is connected to a motor 12, outside the reducer 10.

A ball nut 40 is coupled to the ball screw 20 and is capable of moving forward or backward in a lengthwise direction of the ball screw 20 during rotation of the ball screw 20. Although not illustrated in FIG. 1, a mover that moves back and forth is connected to the ball nut 40.

A coupling 31 is provided around the ball screw 20 to couple the ball screw 20 to the reducer 10 outside the reducer 10.

A thrust and radial support bearing 32 for supporting a load in an axial direction of the ball screw 20 and the mover is provided around the coupling 31.

Structures such as a locking block 33 and a support block 34 are disposed radially outside the thrust and radial support bearing 32, as a device for fixing the thrust and radial support bearing 32, and the elements are fixed at corresponding positions by a plurality of locking bolts 35.

In this state, when the ball screw 20 rotates clockwise or counterclockwise by the operation of the reducer 10, the ball nut 40 may move forward or backward in the lengthwise direction of the ball screw 20, and accordingly the mover moves forward or backward, there by performing a necessary work of a process.

Meanwhile, the servo cylinder 1 of the form of FIG. 1 is the most general type of the servo cylinder 1 with the ball screw 20. In the servo cylinder 1 according to the related art, as an external coupling structure of the ball screw 20, as indicated by a region C where the ball screw 20 is coupled to the reducer 10 outside the reducer 10, is adopted, the total length of the servo cylinder 1 may be increased.

Actually, when the total length of the servo cylinder 1 is increased, the servo cylinder 1 having a long length as above is applied to robots for a logistics system of an automobile assembly line or a production system of industrial automation, it has been reported that much difficulties in application may occur due to interference with peripheral structures.

Furthermore, in the case of the servo cylinder 1 according to the related art, as the external coupling structure of the ball screw 20 is adopted, in order to couple the ball screw 20 to the reducer 10 outside the reducer 10, a rather complex structure of the coupling 31, the thrust and radial support bearing 32, the locking block 33, and the support block 34 is unavoidably employed, and thus a compact servo cylinder of a new concept that has not been known is demanded.

SUMMARY OF THE INVENTION

The inventive concept provides a servo cylinder which may reduce the total length of equipment with respect to the same stroke by employing an internal ball-screw coupling structure in which one end portion of a ball screw is coupled to a reducer inside the reducer, unlike the related art, and may also implement compact equipment by simplifying the structure thereof.

According to the inventive concept, unlike the related art, as an internal ball-screw coupling structure in which one end portion of a ball screw is coupled to a reducer inside the reducer is employed, the total length of equipment may be reduced with respect to the same stroke, and furthermore, as the structure thereof is simplified, compact equipment may be implemented.

DETAILED DESCRIPTION OF THE PREFERRED EMBODIMENT(S)

Figure 1:
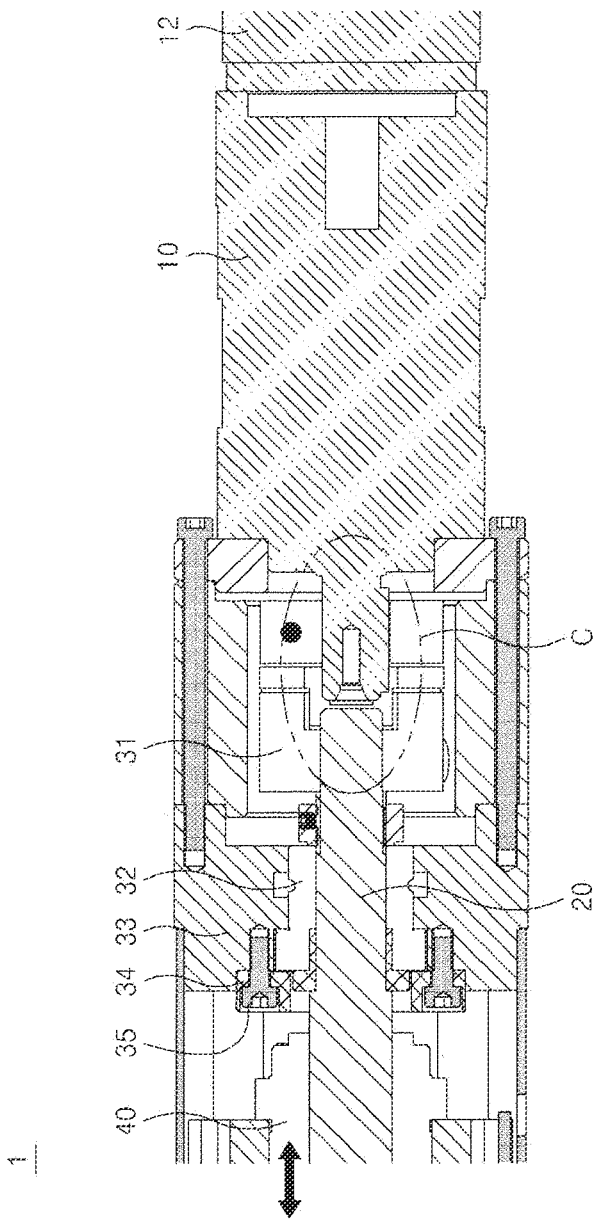
FIG. 1 is a partial cross-sectional view of a general.

According to an aspect of the present inventive concept, a servo cylinder includes a reducer comprising a reducer main body connected to a motor and a speed reduction output part provided in the reducer main body, the speed reduction output part outputting power from the motor by reducing a rotation speed and increasing torque; a ball screw coupled to the speed reduction output part inside the reducer when one end portion region of the ball screw is inserted into the reducer, the ball screw performing a rotational motion by the speed reduction output part; and a motion conversion output part connected to the ball screw and converting the rotational motion of the ball screw to a linear motion and outputting a converted motion.

The speed reduction output part may include a division-type speed reduction output part in which the speed reduction output part is divided into a plurality of parts in a lengthwise direction of the ball screw and the plurality of parts are combined into one body for improvement of contact support area with the ball screw.

The division-type speed reduction output part may include a first internal reduction output module coupled to internal parts in the reducer main body inside the reducer main body, and to which an end portion of the ball screw is coupled, and a second internal reduction output module coupled to the first internal reduction output module in a thickness direction of the first internal reduction output module, and supporting the one end portion region of the ball screw with the first internal reduction output module.

The second internal reduction output module may be manufactured in a disc shape, the first internal reduction output module may be thicker than the second internal reduction output module and may have a cylindrical shape with a step formed at one side thereof, and a seating recess for seating an end portion of the first internal reduction output module may be formed at one surface of the second internal reduction output module toward the first internal reduction output module.

A non-circular section coupling part having a non-circular sectional shape and coupled to the first internal reduction output module and the second internal reduction output module may be the end portion of the ball screw, and a non-circular coupling hole, to which a shape of the non-circular section coupling part of the ball screw 130 fits, may be formed at central areas of the first internal reduction output module and the second internal reduction output module.

A shaft coupling hole coupled to a shaft provided in the reducer main body in a lengthwise direction of the ball screw may be formed at the end portion of the ball screw.

An output part arrangement groove part in which the division-type speed reduction output part is disposed may be formed in the reducer main body, and a thrust supporting thrust bearing for supporting an axial directional load of the division-type speed reduction output part, to which the ball screw is coupled, may be formed in the output part arrangement groove part.

The servo cylinder may further include a pair of ball bearings coupled to a lower area of the thrust supporting thrust bearing inside the reducer main body, arranged spaced apart from each other in the lengthwise direction of the ball screw, and supporting a radial directional load by the linear motion of the ball screw.

The motion conversion output part may include a ball nut coupled to the ball screw and moving in a lengthwise direction of the ball screw during a rotation of the ball screw, and a moving block forming one body with the ball nut and moving along the ball nut.

The ball nut may include a nut plate coupled to one end portion of the moving block in surface contact therewith, an insertion coupling part extending from one side of the nut plate and coupled to the moving block by being inserted into a center through-hole of the moving block, and a protruding support part protruding from another side of the nut plate and having one end portion supported by the speed reduction output part in contact therewith.

The motion conversion output part may include a coupling flange coupled to the moving block in surface contact with one end portion of the moving block, a screw cap connected to the coupling flange, and into which the ball screw is inserted, and a mover performing a linear motion while moving with the moving block.

The motion conversion output part may further include a guide part that guides the linear motion of the mover.

The guide part may include a guide block having a through-hole through which the mover passes and arranged spaced apart by a predetermined distance from the reducer main body, and a guide bar having one end portion coupled to the guide block and another end portion coupled to the reducer main body by passing through a bar through-hole of the moving block.

The guide bar may include a plurality of guide bars arranged at equal intervals in a circumferential direction of the mover.

A ball bush for supporting the guide bar may be included in the bar through-hole of the moving block through which the guide bar passes.

The ball bush is press-fitted into the bar through-hole of the moving block.

The attached drawings for illustrating preferred embodiments of the present disclosure are referred to in order to gain a sufficient understanding of the present disclosure, the merits thereof, and the objectives accomplished by the implementation of the present disclosure.

Hereinafter, the inventive concept will be described in detail by explaining preferred embodiments of the inventive concept with reference to the attached drawings. Like reference numerals in the drawings denote like elements.

Figure 2:
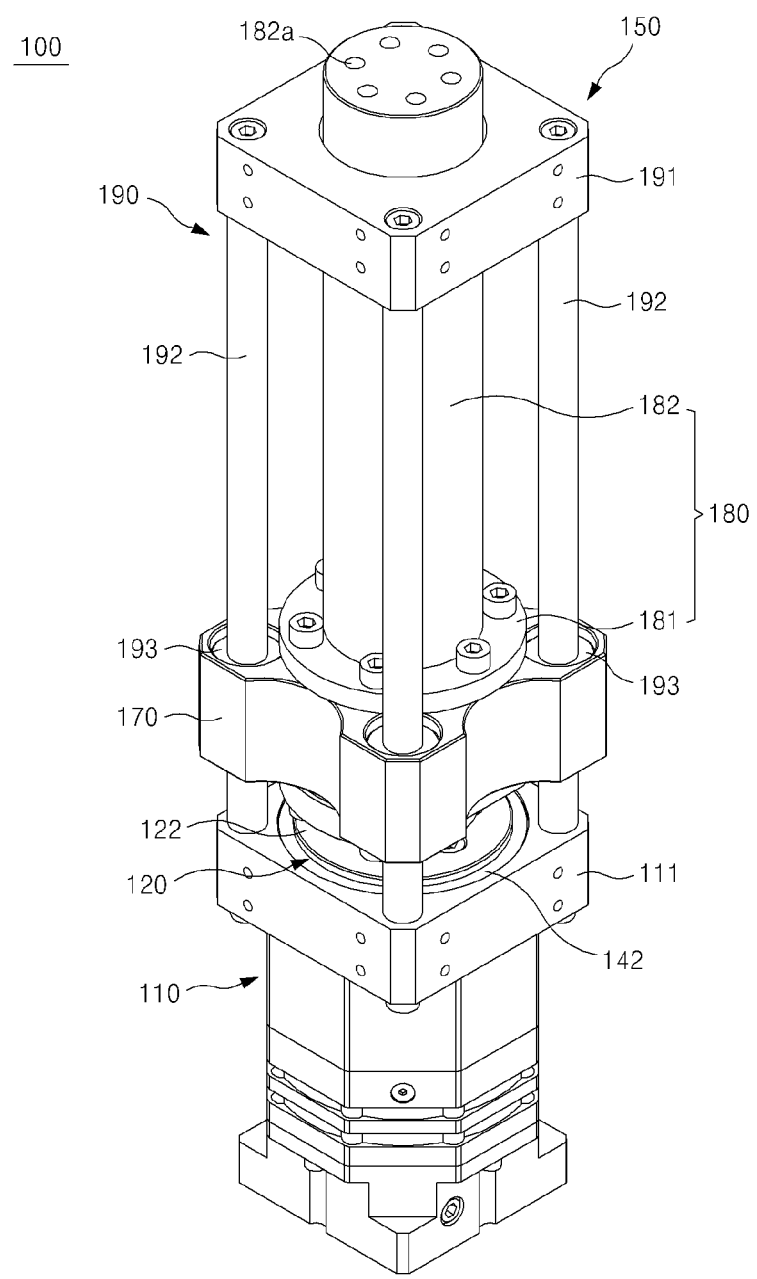
FIG. 2 is a perspective view of a servo cylinder according to an embodiment of the present disclosure.
Figure 3:
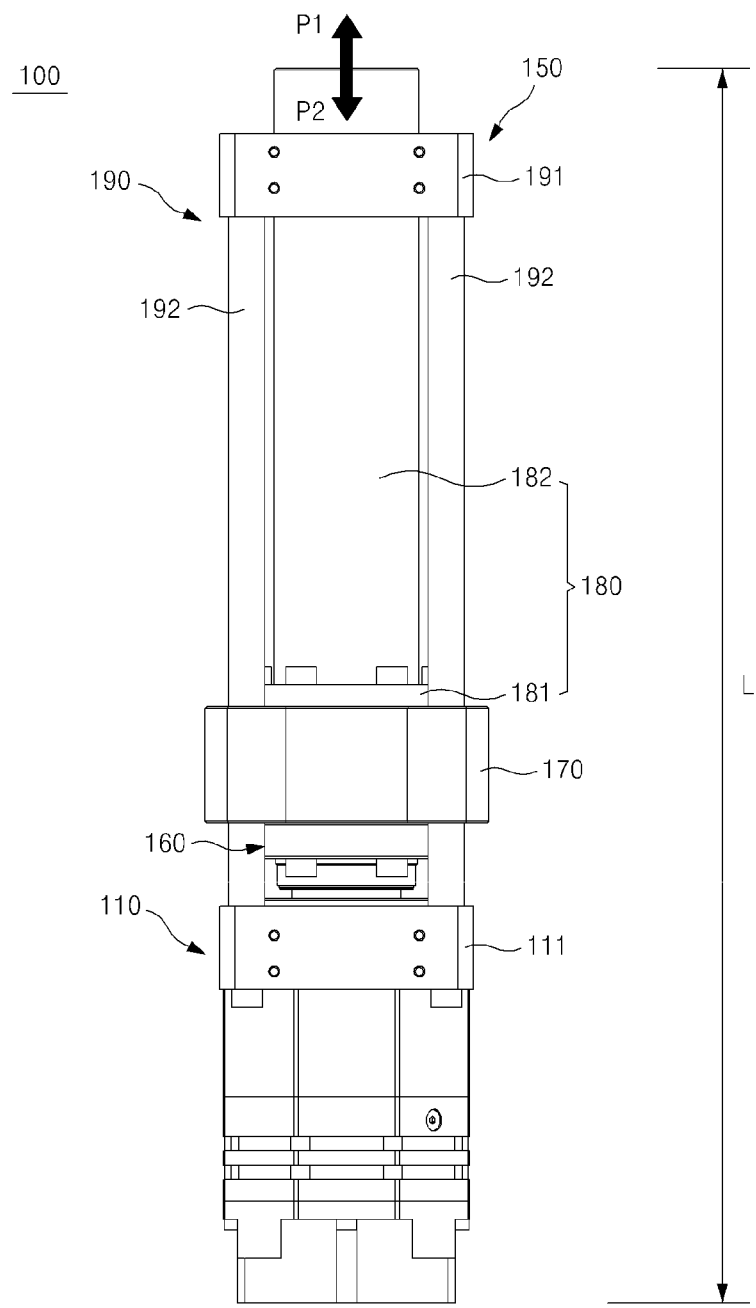
FIG. 3 is a front view of FIG. 2.
Figure 4:
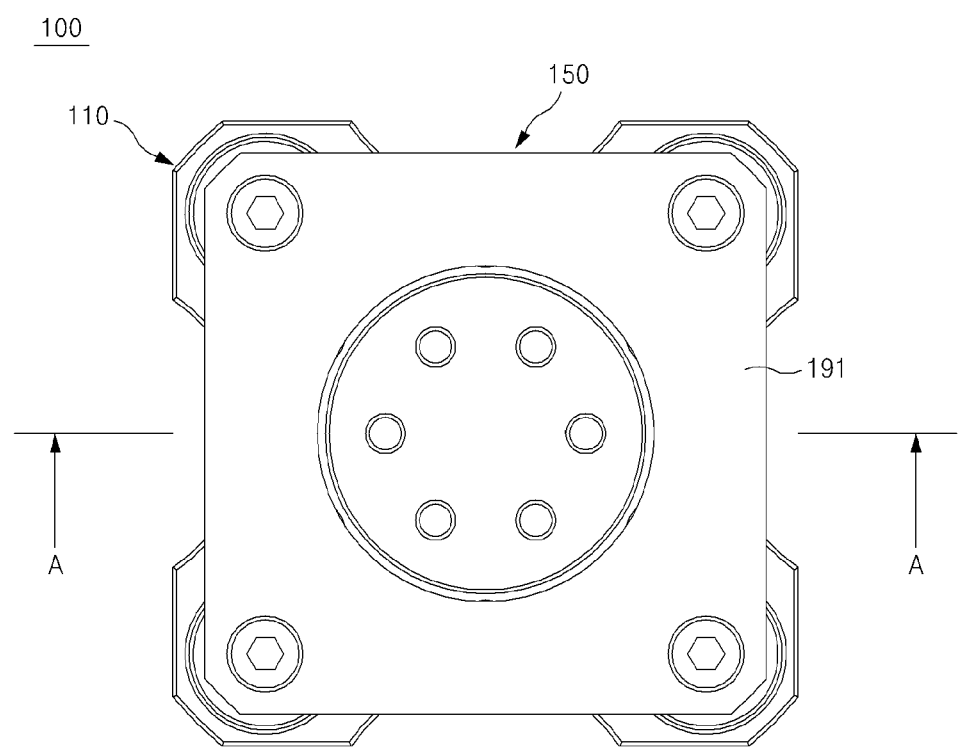
FIG. 4 is a plan view of FIG. 2.
Figure 5:
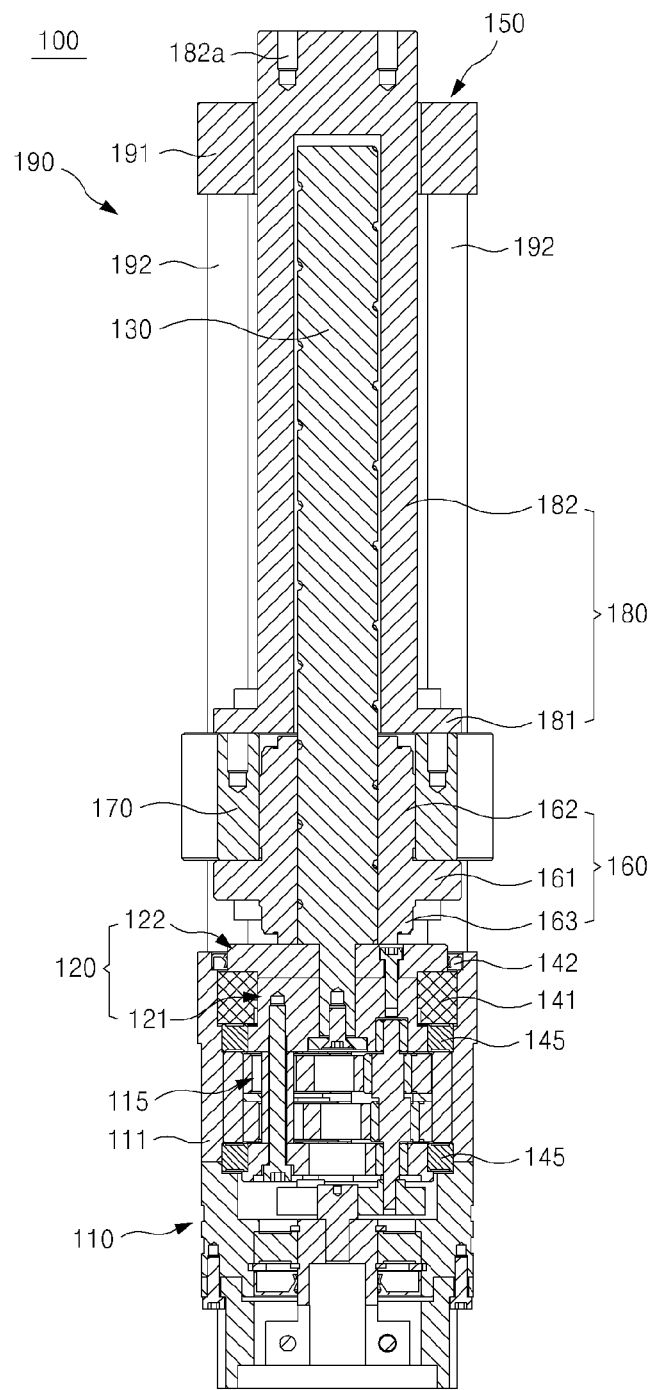
FIG. 5 is a cross-sectional view taken along line A-A of FIG. 4.
Figure 6:
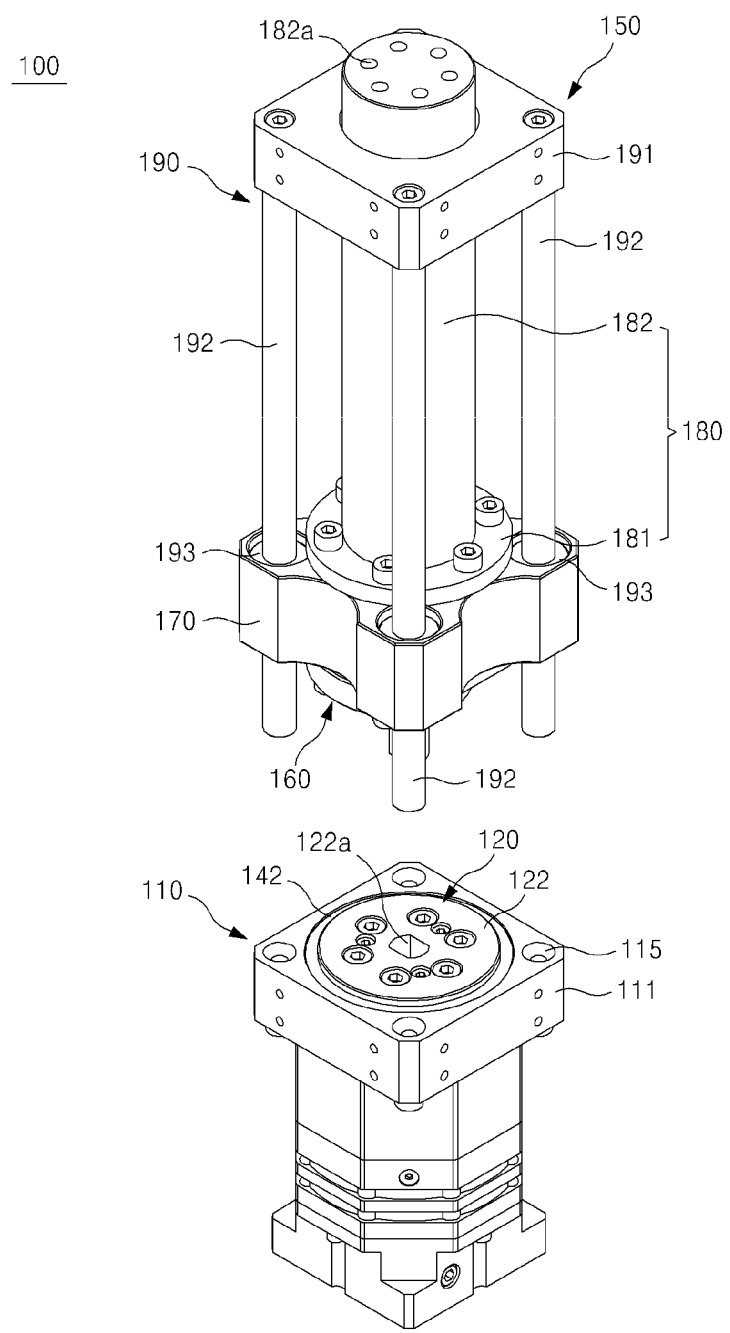
FIG. 6 is an exploded perspective view of FIG. 2.
Figure 7:
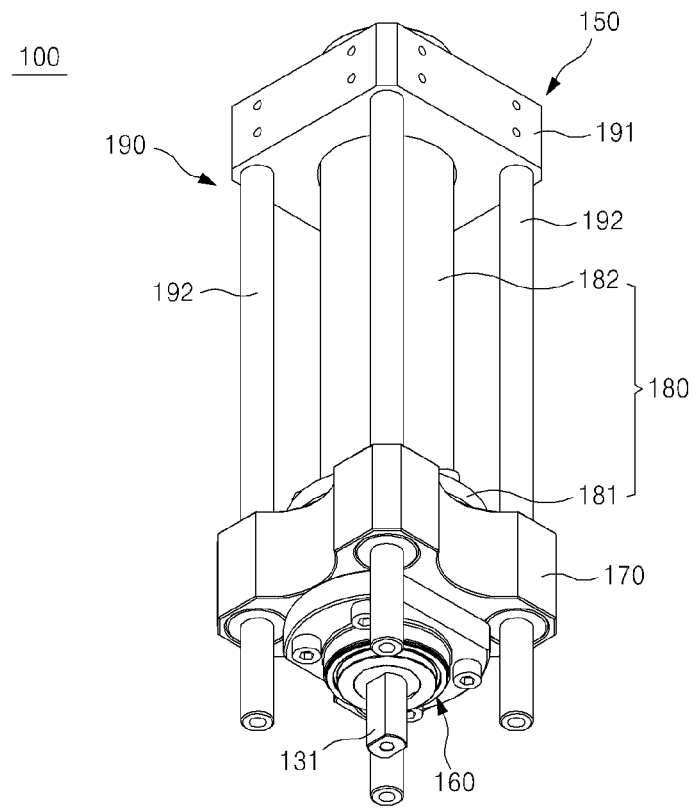
FIG. 7 is a rear perspective view of FIG. 6.
Figure 7:
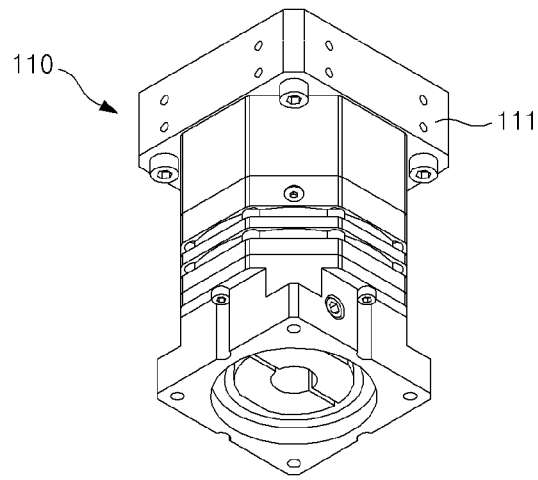
Figure 8:
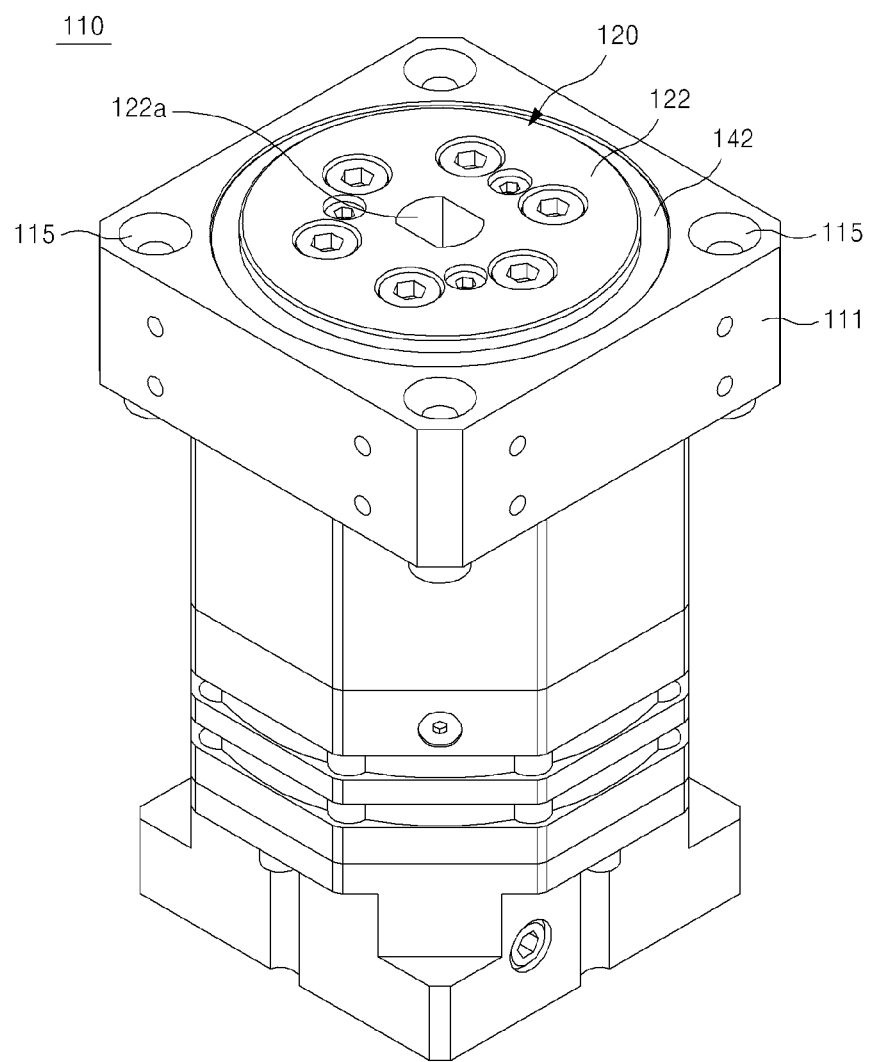
FIG. 8 is an enlarged perspective view of a reducer.
Figure 9:
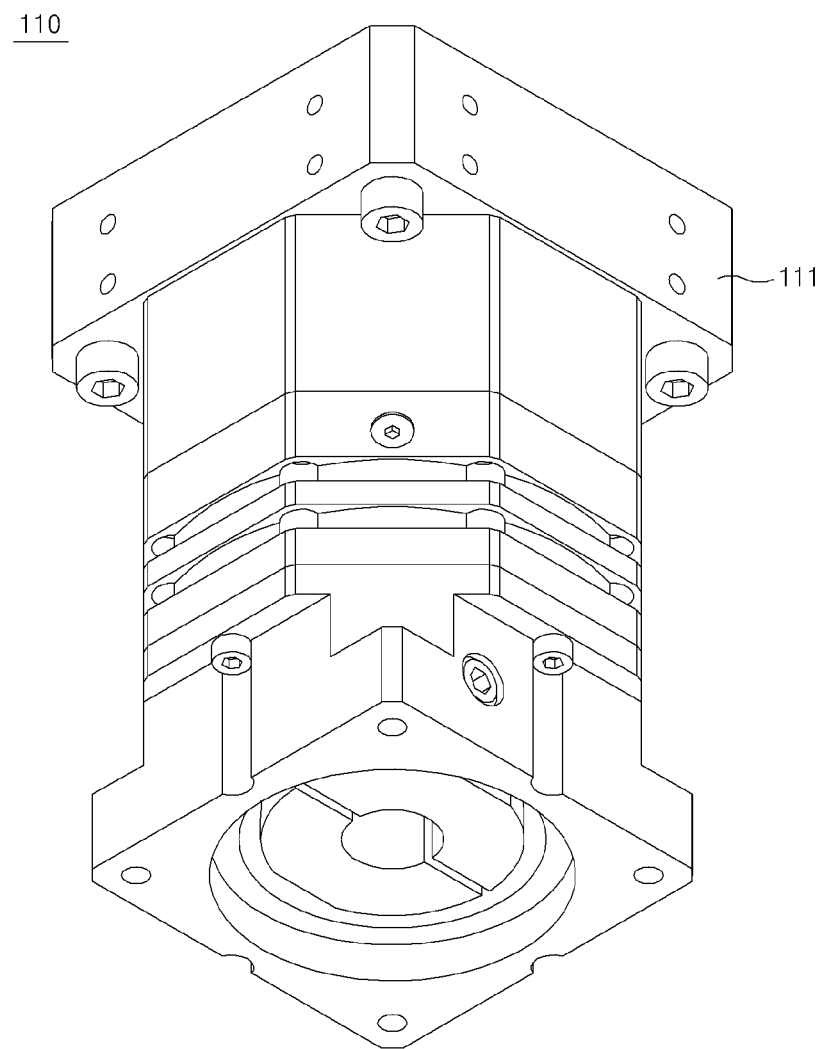
FIG. 9 is a rear perspective view of FIG. 8.
Figure 10:
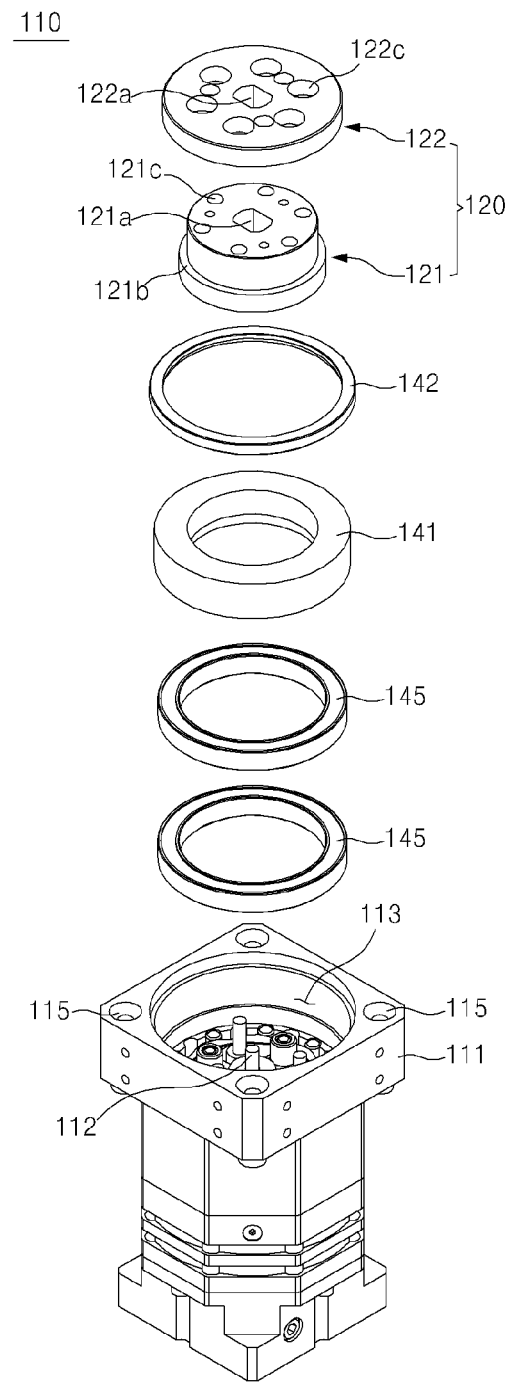
FIG. 10 is an exploded perspective view of FIG. 8.
Figure 11:
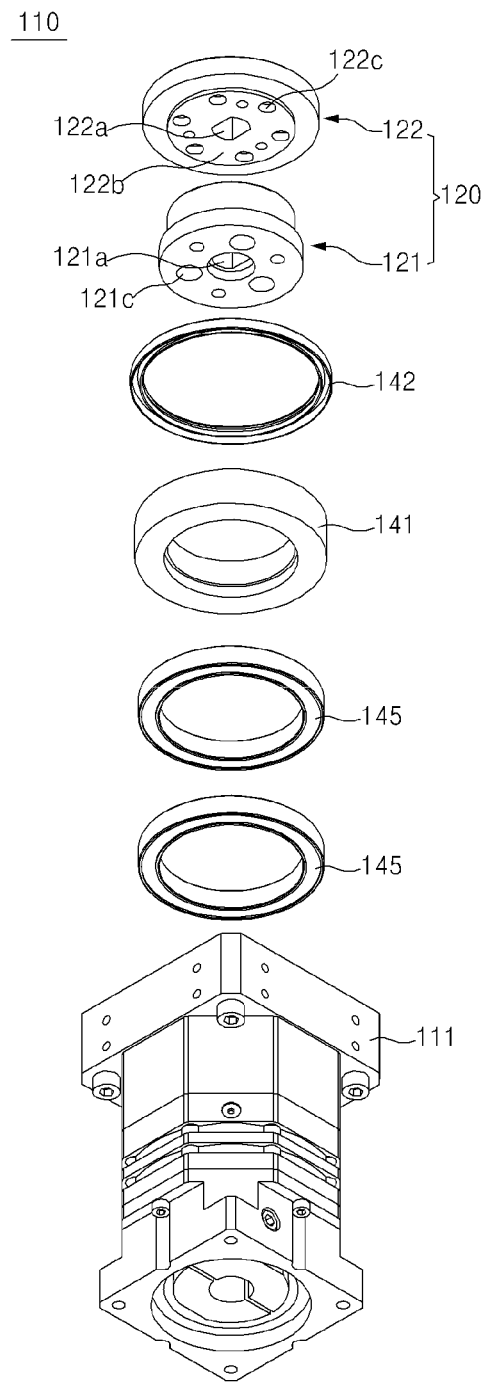
FIG. 11 is an exploded perspective view of FIG. 10.
Figure 12:
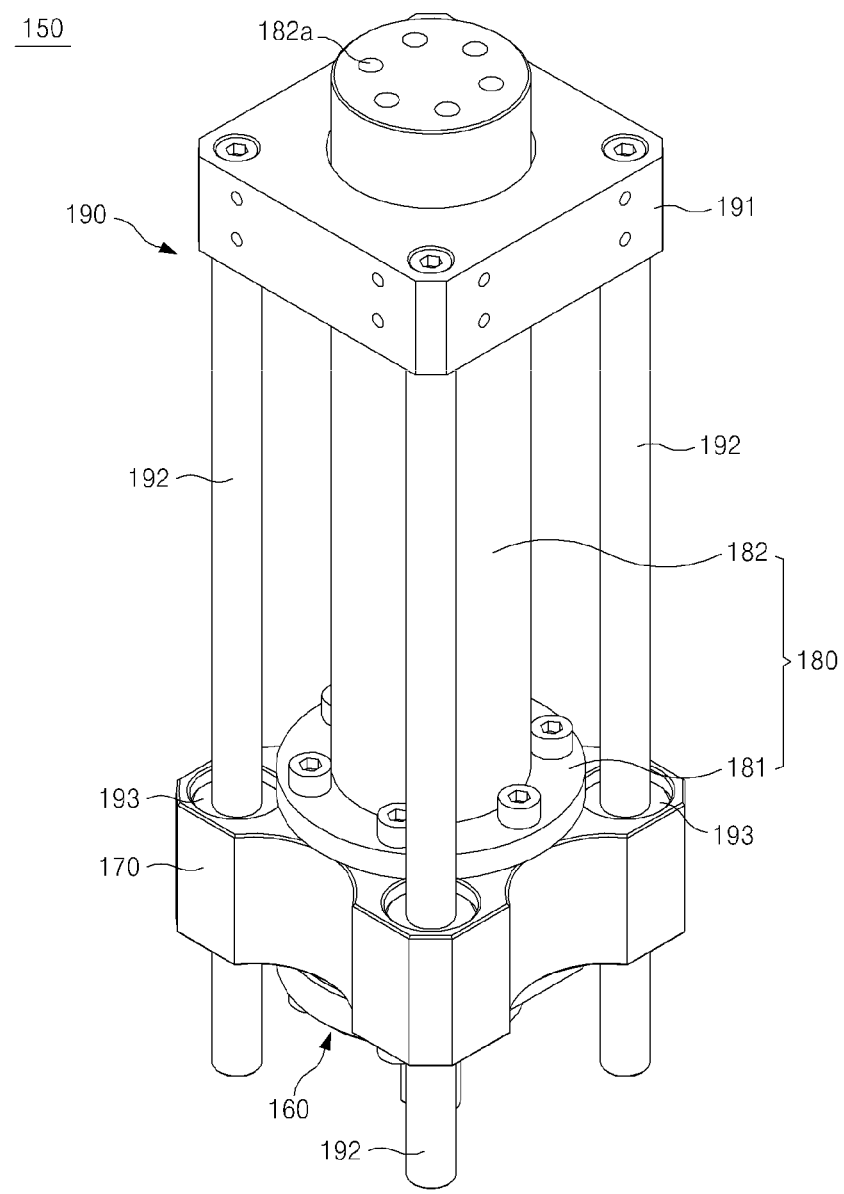
FIG. 12 is a perspective view of a motion conversion output part including a ball screw.
Figure 13:
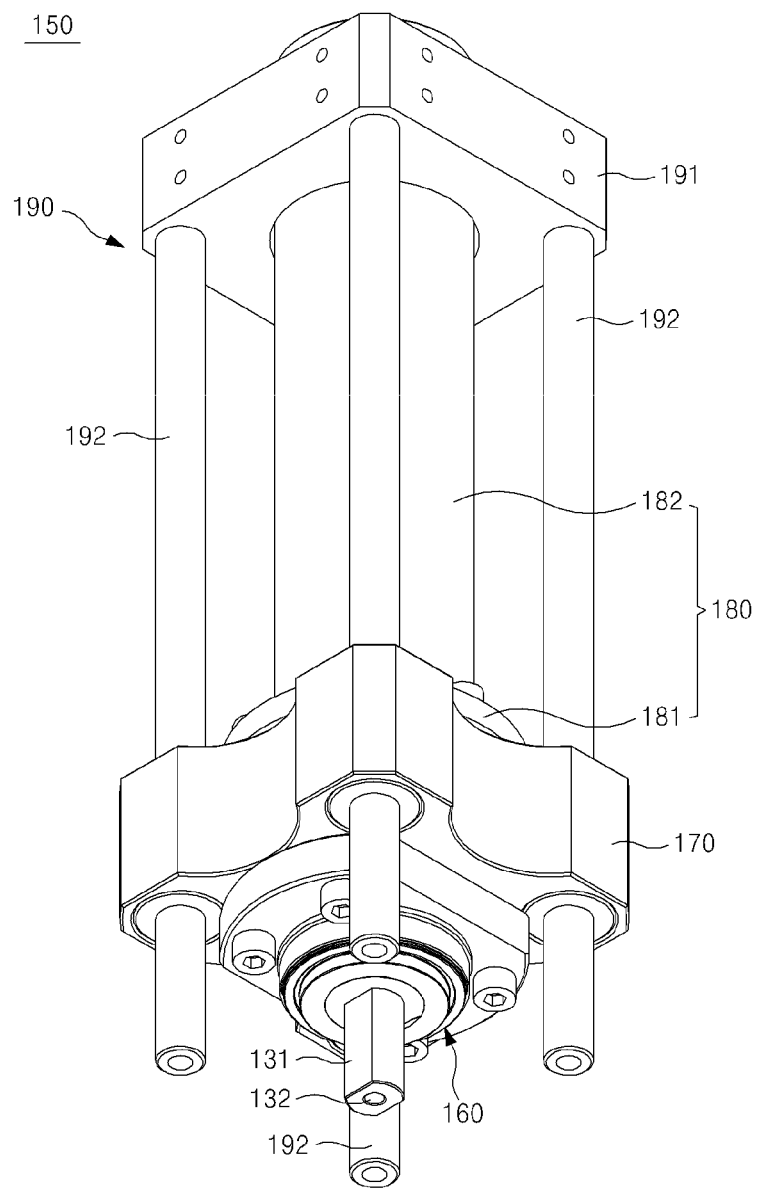
FIG. 13 is a rear perspective view of FIG. 12.
Figure 14:
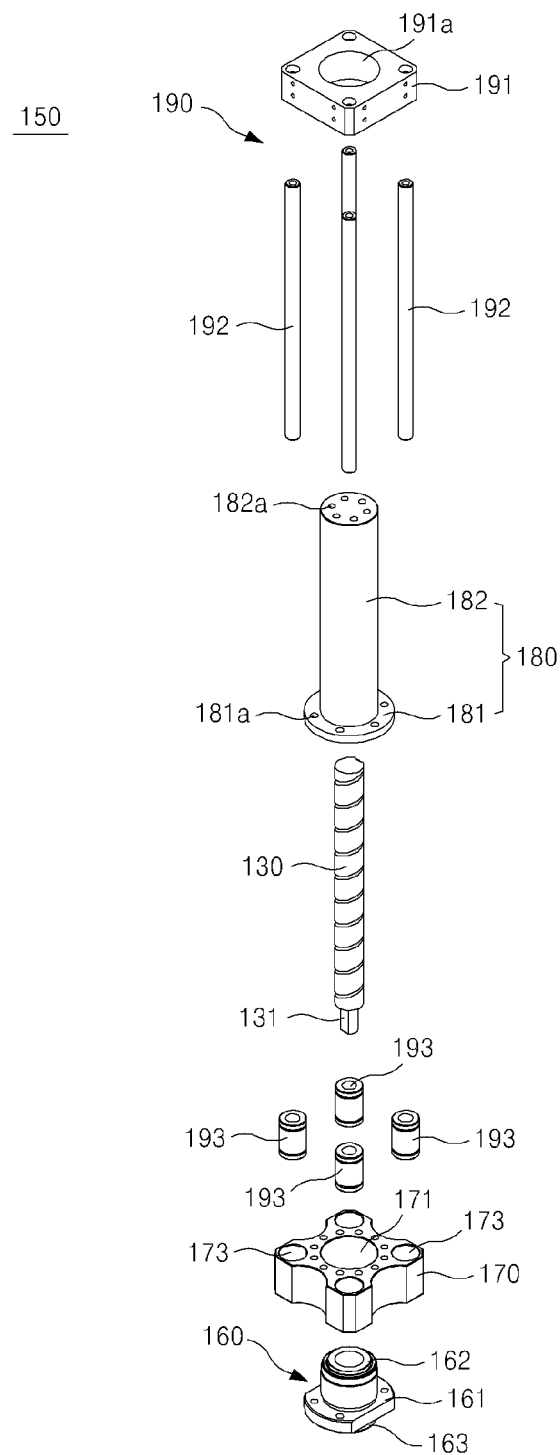
FIG. 14 is an exploded perspective view of FIG. 12.
Figure 15:
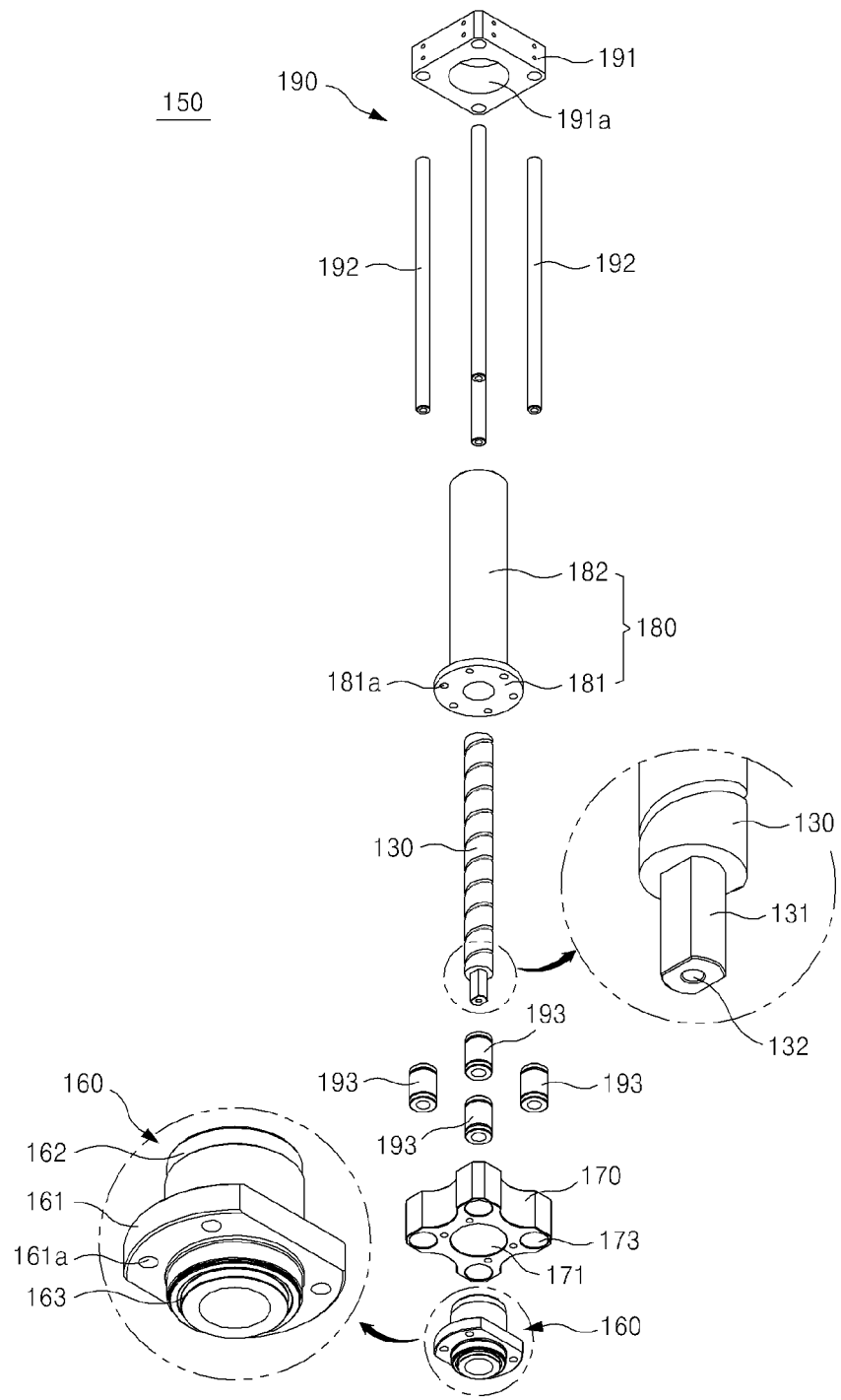
FIG. 15 is an exploded perspective view of FIG. 14.

FIG. 2 is a perspective view of a servo cylinder according to an embodiment of the present disclosure. FIG. 3 is a front view of FIG. 2. FIG. 4 is a plan view of FIG. 2. FIG. 5 is a cross-sectional view taken along line A-A of FIG. 4. FIG. 6 is an exploded perspective view of FIG. 2. FIG. 7 is a rear perspective view of FIG. 6. FIG. 8 is an enlarged perspective view of a reducer. FIG. 9 is a rear perspective view of FIG. 8. FIG. 10 is an exploded perspective view of FIG. 8. FIG. 11 is an exploded perspective view of FIG. 10. FIG. 12 is a perspective view of a motion conversion output part including a ball screw. FIG. 13 is a rear perspective view of FIG. 12. FIG. 14 is an exploded perspective view of FIG. 12. FIG. 15 is an exploded perspective view of FIG. 14.

Referring to these drawings, according to the present embodiment, a servo cylinder 100 may reduce the total length L (see FIG. 3) of equipment with respect to the same stroke by employing an internal ball-screw coupling structure in which one end portion of a ball screw 130 is coupled to a reducer inside the reducer 110, unlike the related art, and may also implement compact equipment by simplifying the structure thereof. The servo cylinder 100 may include the reducer 110, the ball screw 130 connected to the reducer 110 and rotated by the reducer 110, and a motion conversion output part 150 converting and outputting a rotational motion of the ball screw 130 to a linear motion.

The reducer 110, which is a speed reduction device connected to a motor (not shown), outputs power from the motor by reducing a rotation speed of the motor and increasing torque thereof.

The reducer 110 may include various types such as a spur gear type, a planetary gear type, and a belt drive type, and any type of reducer may be employed to provide the effect of the present disclosure. In this state, in the present embodiment, for convenience of explanation, a detailed structure of the reducer 110 is not illustrated.

The motor to which the reducer 110 is connected may be a servo motor or an electric motor. When a servo motor is employed, an effect of precision control may be provided.

The reducer 110 may include a reducer main body 111 connected to the motor and having a plurality of internal parts 115 (see FIG. 5) for speed reduction and a speed reduction output part 120 provided in the reducer main body 111 and output the power of the motor by reducing the rotation speed of the motor and increasing the torque thereof.

The reducer main body 111 forms an exterior structure of the reducer 110. The internal parts 115 having various structures to reduce the rotation speed of the motor and increasing the torque thereof are provided in the reducer main body 111. Although the internal parts 115 are not illustrated and described in detail, the internal parts 115 may reduce the rotation speed of the motor and increase the torque thereof through the structure such as a spur gear type, a planetary gear type, and a belt drive type.

The speed reduction output part 120 is connected to the internal parts 115 and the ball screw 130 of the reducer 110 and provides rotational torque to rotate the ball screw 130. In other words, the ball screw 130 may be rotated as the rotational torque generated by the internal parts 115 in the reducer main body 111 is transferred to the ball screw 130.

In the present embodiment, the speed reduction output part 120 may be of a division-type speed reduction output part in which the speed reduction output part 120 is divided into a plurality of parts in a lengthwise direction of the ball screw 130 and the plurality of parts are combined into one body, i.e., are non-rotatable relative to each other. The division-type speed reduction output part 120 is provided in an output part arrangement groove part 113 (see FIG. 10) in a groove shape that is formed in the reducer main body 111.

Meanwhile, as described above with reference to FIG. 1, in the related art, the so-called external coupling structure of the ball screw 20 in which the ball screw 20 is coupled to the reducer 10 outside the reducer 10 has been adopted. Accordingly, the total length of the servo cylinder 1 has been necessarily increased, and furthermore a complex structure due to the external coupling structure of the ball screw 20 was unavoidable.

However, in the present embodiment, unlike the structure according to the related art, a structure is provided in which one end portion region of the ball screw 130 that is inserted into the reducer 110 is coupled to the division-type speed reduction output part 120 inside the reducer 110. In other words, the output part arrangement groove part 113 in a groove shape is formed in the reducer main body 111, the division-type speed reduction output part 120 is provided in the output part arrangement groove part 113, and the one end portion region of the ball screw 130 is coupled to the division-type speed reduction output part 120 in the output part arrangement groove part 113.

When the one end portion region of the ball screw 130, that is, a non-circular section coupling part 131 forming an end portion of the ball screw 130, is coupled to the division-type speed reduction output part 120 inside the reducer 110, as in the present embodiment, the total length L (see FIG. 3) of equipment may be reduced compared with the servo cylinder 1 of FIG. 1 with respect to the same stroke, and furthermore a structure thereof may be simplified so that compact equipment may be implemented.

Actually, according to the present embodiment, a compact structure may be implemented because the servo cylinder 100 does not need a complex structure such as the coupling 31, the thrust and radial support bearing 32, the locking block 33, and the support block 34, which are applied to the servo cylinder 1 (see FIG. 1) according to the related art.

Meanwhile, when the ball screw 130 is coupled inside the reducer 110 with the one end portion region of the ball screw 130 being inserted into the reducer 110, as in the present embodiment, a stable support of the ball screw 130 is needed. To this end, the division-type speed reduction output part 120 is employed.

The division-type speed reduction output part 120 may include a first internal reduction output module 121 coupled to the internal parts 115 in the reducer main body 111 inside the output part arrangement groove part 113 of the reducer main body 111, and to which the end portion of the ball screw 130 is coupled, and a second internal reduction output module 122 non-rotatably coupled to the first internal reduction output module 121 in a thickness direction of the first internal reduction output module 121 and supporting the end portion region of the ball screw 130 with the first internal reduction output module 121.

As such, when the division-type speed reduction output part 120 is manufactured in a dual type of the first internal reduction output module 121 and the second internal reduction output module 122 and then the ball screw 130 is coupled to the division-type speed reduction output part 120, a contact support area with the ball screw 130 may be increased, and thus the ball screw 130 may be stably supported.

As described below, structurally, the ball screw 130 may not have a support structure in a portion where an output discharge portion, that is, a guide block 191, is located. Accordingly, the ball screw 130 needs to be firmly supported at the opposite side, that is, at the division-type speed reduction output part 120.

Accordingly, in the present embodiment, by manufacturing the division-type speed reduction output part 120 in a dual type of the first internal reduction output module 121 and the second internal reduction output module 122 and allowing the end portion of the ball screw 130 to be coupled to the division-type speed reduction output part 120, the ball screw 130 may be stably supported with a support area as large as possible.

In the present embodiment, while the second internal reduction output module 122 is formed in a disc shape, the first internal reduction output module 121 has a cylindrical shape having a thickness greater than the second internal reduction output module 122 and has a step 121b formed at one side thereof.

In such a structure, a seating recess 122b (see FIG. 11) for seating an end portion of the first internal reduction output module 121 is formed in one surface of the second internal reduction output module 122 toward the first internal reduction output module 121. After the end portion of the first internal reduction output module 121 is seated in the seating recess 122b, the first internal reduction output module 121 and the seating recess 122b may be screw-coupled to each other.

To allow the first internal reduction output module 121 and the second internal reduction output module 122 to be screw-coupled to each other, a plurality of through-holes 121c and 122c are respectively formed in the first internal reduction output module 121 and the second internal reduction output module 122.

As described above, the end portion of the ball screw 130 is coupled to the division-type speed reduction output part 120 including the first internal reduction output module 121 and the second internal reduction output module 122. In this state, the ball screw 130 is prevented from being freely rotated with respect to the division-type speed reduction output part 120.

To this end, the non-circular section coupling part 131 having a non-circular sectional shape and coupled to the first internal reduction output module 121 and the second internal reduction output module 122 is formed at the end portion of the ball screw 130. In the present embodiment, the non-circular section coupling part 131 forms a D-cut sectional structure (see FIG. 15).

Non-circular coupling holes 121*a* and 122*a*, to which the shape of the non-circular section coupling part 131 of the ball screw 130 fits, are formed at central areas of the first internal reduction output module 121 and the second internal reduction output module 122, respectively.

A shaft coupling hole 132 (see FIG. 15), which is coupled to a shaft 112 (see FIG. 10) provided in the reducer main body 111 in the lengthwise direction of the ball screw 130, is formed at the end portion of the ball screw 130.

Accordingly, the non-circular section coupling part 131 forming the end portion of the ball screw 130 may pass through the non-circular coupling hole 122*a* of the second internal reduction output module 122 to be disposed in the non-circular coupling hole 121*a* of the first internal reduction output module 121, and may be coupled to the division-type speed reduction output part 120 such that the shaft coupling hole 132 is inserted around the shaft 112. Thus, the first internal reduction output module 121 and the second internal reduction output module 122 are non-rotatable relative to each other and to the ball screw 130.

Accordingly, a phenomenon of idling of the ball screw 130 may be prevented and furthermore a stable support structure of the ball screw 130 may be obtained. In other words, as the non-circular section coupling part 131 of the ball screw 130 is coupled to division-type speed reduction output part 120 by being disposed on the first internal reduction output module 121 and the second internal reduction output module 122 with a large support area, a stable support structure of the ball screw 130 may be obtained.

A thrust supporting thrust bearing 141 for supporting an axial directional load of the division-type speed reduction output part 120 to which the ball screw 130 is coupled is provided in the output part arrangement groove part 113 of the reducer 110 where the division-type speed reduction output part 120 is disposed.

The thrust supporting thrust bearing 141 may be coupled to the outside of the first internal reduction output module 121 of the division-type speed reduction output part 120 in a radial direction thereof, and at the position, may support the axial directional load of the division-type speed reduction output part 120 including the ball screw 130, that is, a thrust by a linear motion of the ball screw 130. Accordingly, a stable support structure of the ball screw 130 may be obtained and furthermore an ideal rotational motion of the ball screw 130 without being bent may be facilitated.

Meanwhile, a pair of ball bearings 145 are applied to a lower area of the thrust supporting thrust bearing 141. In the present embodiment, the ball bearings 145 are coupled to the lower area of the thrust supporting thrust bearing 141 in the reducer main body 111 to be spaced apart from each other in the lengthwise direction of the ball screw 130, and support the radial directional load by the linear motion of the ball screw 130. In this state, as a separation distance between the ball bearings 145 is great, a more moment (sagging) load operation is possible.

For reference, although a ball bush has a stable structure due to both end supports of the reducer main body 111 and the output discharge portion (end portion of a cylinder), the ball screw 130 may not have a support structure at the output discharge portion due to its structure.

To reinforce this point, in the present embodiment, the ball bearings 145 having a wide separation distance are employed. In other words, the ball bearings 145 support a radial direction load by the linear motion of the ball screw 130 as a width of the reducer 110, by a support distance as wide as possible, with an output axis and an input axis of the reduction structure, and thus a support force of the ball screw 130 may be increased. In this case, precession vibration may be reduced.

An oil seal 142 for preventing leakage of lubricant is coupled to an entrance region of the output part arrangement groove part 113 of the reducer 110 where the division-type speed reduction output part 120 is disposed. The oil seal 142 may be of a replaceable type.

Meanwhile, the motion conversion output part 150 is connected to the ball screw 130 and converts a rotational motion of the ball screw 130 to a linear motion and output the converted motion.

In other words, when the ball screw 130 rotate by the operation of the reducer 110, a mover 180 may advance in a direction P1 or retreat in a direction P2 as indicated by an arrow in FIG. 3 by the operation of the motion conversion output part 150 connected to the ball screw 130.

As a result, the motion conversion output part 150 provides the rotational motion of the ball screw 130 to a linear motion of the mover 180.

The motion conversion output part 150 may include a ball nut 160 and a moving block 170 moving as one body, the mover 180 that performs a substantially linear motion, and a guide part 190 for guiding the linear motion of the mover 180.

The ball nut 160 is screw-coupled to the ball screw 130 and is moved in the lengthwise direction of the ball screw 130 during rotation of the ball screw 130.

In the present embodiment, the ball nut 160 may include a nut plate 161 coupled to an one end portion of the moving block 170 in surface contact therewith, an insertion coupling part 162 extending from one side of the nut plate 161 and inserted into a center through-hole 171 (see FIGS. 14 and 15) of the moving block 170, and a protruding support part 163 protruding from the other side of the nut plate 161 and having an end portion contacting the speed reduction output part 120 and supported thereby.

After the insertion coupling part 162 of the ball nut 160 is inserted into the center through-hole 171 of the moving block 170, the ball nut 160 and the moving block 170 are screw-coupled to each other. To this end, a plurality of through-holes 161*a* (see FIG. 15) for screw coupling are formed on the circumference of the nut plate 151.

The moving block 170 is coupled to the ball nut 160 forming one body with the ball nut 160, as described above.

During the rotation of the ball screw 130, the ball nut 160 may move in the lengthwise direction of the ball screw 130. As the moving block 170 form one body with the ball nut 160, during the rotation of the ball screw 130, the moving block 170 may also move in the lengthwise direction of the ball screw 130.

The mover 180 is connected to the moving block 170 and is a portion for performing a substantially linear motion. A robot arm needing a linear motion may be connected to the mover 180 or may be implemented by including the mover 180.

The mover 180 may include a coupling flange 181 coupled to the one end portion of the moving block 170 in surface contact therewith and a screw cap 182 connected to the coupling flange 181 and into which the ball screw 130 is inserted.

To connect the mover 180 to the moving block 170, that is, to be screw-coupled to each other, a plurality of through-holes 181a (see FIGS. 14 and 15) are formed in the coupling flange 181 of the mover 180. A plurality of through-holes 182a are formed at an end portion of the screw cap 182, and a robot arm may be connected to the screw cap 182 through the through-holes 182a.

Meanwhile, in order for the mover 180 to ideally perform a linear motion in the directions P1 and P2 as indicated by an arrow in FIG. 3, the linear motion of the mover 180 needs to be guided.

To this end, according to the present embodiment, the motion conversion output part 150 is provided with the guide part 190. In other words, the guide part 190 guides the linear motion of the mover 180.

The guide part 190 may include the guide block 191 disposed to be spaced apart from the reducer main body 111 and a plurality of guide bars 192 connected to the guide block 191.

The guide block 191, as a fixed structure that does not move like the mover 180, is disposed at one side of the reducer main body 111. A through-hole 191a through which the screw cap 182 of the mover 180 passes is formed in the guide block 191. Accordingly, when the ball screw 130 is rotated by the operation of the reducer 110, the mover 180 may perform a linear motion in the direction P1 or direction P2 of FIG. 3 through the through-hole 191a of the guide block 191.

The guide bars 192 substantially guides the linear motion of the mover 180. Each of the guide bars 192 has one end portion coupled to the guide block 191 and the other end portion coupled to a bar coupling hole 115 (see FIG. 10) of the reducer main body 111 by passing through a bar through-hole 173 (see FIG. 14) of the moving block 170. As the moving block 170 is guided by the guide bars 192, the mover 180 connected to the moving block 170 may also perform a linear motion back and forth in a regular direction without being bent.

In the present embodiment, a ball bush 193 for supporting each of the guide bars 192 is included in the bar through-hole 173 of the moving block 170 through which each of the guide bars 192 passes.

The ball bush 193 may support each of the guide bars 192 by being press-fitted into the bar through-hole 173 of the moving block 170. Accordingly, a stable guide motion of the moving block 170 with respect to the guide bars 192 may be obtained.

As described above in detail, according to the present embodiment, unlike FIG. 1 according to the related art, the servo cylinder 100 has a structure in which, while the one end portion region of the ball screw 130 is inserted into the inside of the reducer 110, the ball screw 130 is coupled to the division-type speed reduction output part 120 inside the reducer 110.

As in the present embodiment, when the one end portion region of the ball screw 130, that is, the non-circular section coupling part 131 forming the end portion of the ball screw 130, is coupled to the division-type speed reduction output part 120 inside the reducer 110, the total length L (see FIG. 3) of equipment may be reduced with respect to the same stroke as that of the servo cylinder 1 of FIG. 1, and furthermore a structure thereof may be simplified so that compact equipment may be implemented.

According to the present embodiment having the structure and operation as described above, unlike the related art, as the internal ball-screw coupling structure is employed in which the one end portion of the ball screw 130 is coupled to the division-type speed reduction output part 120 inside the reducer 110, the total length L (see FIG. 3) of equipment may be reduced with respect to the same stroke, and furthermore a structure thereof may be simplified so that compact equipment may be implemented.

While the present disclosure has been particularly shown and described with reference to preferred embodiments using specific terminologies, the embodiments and terminologies should be considered in descriptive sense only and not for purposes of limitation. Therefore, it will be understood by those of ordinary skill in the art that various changes in form and details may be made therein without departing from the spirit and scope of the present disclosure as defined by the following claims.

The present inventive concept may be used for industrial equipment for transporting goods and various logistics transport facilities.

The invention claimed is:

1. A servo cylinder, comprising:
    a reducer comprising a reducer main body connected to a motor, a plurality of internal parts disposed in the reducer main body and configured to reduce a rotation speed of the motor and to increase torque thereof, and a speed reduction output part provided in the reducer main body, the speed reduction output part outputting power from the motor through the internal parts;
    a ball screw coupled to the speed reduction output part inside the reducer when one end portion region of the ball screw is inserted into the reducer, the ball screw performing a rotational motion by the speed reduction output part; and
    a motion conversion output part connected to the ball screw and converting the rotational motion of the ball screw to a linear motion and outputting a converted motion;
    wherein the speed reduction output part comprises a division-type speed reduction output part divided into a plurality of parts in a lengthwise direction of the ball screw;
    wherein the plurality of parts are combined into one body; and
    wherein the division-type speed reduction output part comprises:
        a first internal reduction output module coupled to the internal parts of the reducer disposed inside the reducer main body, and to which an end portion of the ball screw is coupled; and
        a second internal reduction output module non-rotatably coupled to the first internal reduction output module in a thickness direction of the first internal reduction output module, and supporting the one end portion region of the ball screw with the first internal reduction output module.

2. The servo cylinder of claim 1, wherein the second internal reduction output module has a disc shape, wherein the first internal reduction output module is thicker than the second internal reduction output module and has a cylindrical shape with a step formed at one side thereof, and wherein a seating recess for seating an end portion of the first internal reduction output module is formed in one surface of the second internal reduction output module toward the first internal reduction output module.

3. The servo cylinder of claim 1, wherein a non-circular section coupling part has a non-circular sectional shape and is coupled to the first internal reduction output module, wherein the second internal reduction output module is formed at the end portion of the ball screw, and wherein a non-circular coupling hole, to which a shape of the non-circular section coupling part of the ball screw fits, is formed at central areas of the first internal reduction output module and the second internal reduction output module.

4. The servo cylinder of claim 1, wherein a shaft coupling hole coupled to a shaft provided in the reducer main body in a lengthwise direction of the ball screw is formed at the end portion of the ball screw.

5. The servo cylinder of claim 1, wherein an output part arrangement groove part in which the division-type speed reduction output part is disposed is formed in the reducer main body, and
   a thrust supporting thrust bearing for supporting an axial directional load of the division-type speed reduction output part, to which the ball screw is coupled, is formed in the output part arrangement groove part.

6. The servo cylinder of claim 5, further comprising a pair of ball bearings coupled to a lower area of the thrust supporting thrust bearing inside the reducer main body, arranged spaced apart from each other in the lengthwise direction of the ball screw, and supporting a radial directional load by the linear motion of the ball screw.

7. The servo cylinder of claim 1, wherein the motion conversion output part comprises:
   a ball nut coupled to the ball screw and moving in a lengthwise direction of the ball screw during a rotation of the ball screw; and
   a moving block forming one body with the ball nut and moving along the ball nut.

8. The servo cylinder of claim 7, wherein the ball nut comprises:
   a nut plate coupled to one end portion of the moving block in surface contact therewith;
   an insertion coupling part extending from one side of the nut plate and coupled to the moving block by being inserted into a center through-hole of the moving block; and
   a protruding support part protruding from another side of the nut plate and having one end portion supported by the speed reduction output part in contact therewith.

9. The servo cylinder of claim 7, wherein the motion conversion output part comprises a mover performing a linear motion while moving with the moving block, and wherein the mover includes:
   a coupling flange coupled to the moving block in surface contact with one end portion of the moving block; and
   a screw cap connected to the coupling flange, and into which the ball screw is inserted.

10. The servo cylinder of claim 9, wherein the motion conversion output part further comprises a guide part that guides the linear motion of the mover.

11. The servo cylinder of claim 10, wherein the guide part comprises:
   a guide block having a through-hole through which the mover passes and arranged spaced apart by a predetermined distance from the reducer main body; and
   a guide bar having one end portion coupled to the guide block and another end portion coupled to the reducer main body by passing through a bar through-hole of the moving block.

12. The servo cylinder of claim 11, wherein the guide bar comprises a plurality of guide bars arranged at equal intervals in a circumferential direction of the mover.

13. The servo cylinder of claim 11, wherein a ball bush for supporting the guide bar is included in the bar through-hole of the moving block through which the guide bar passes.

14. The servo cylinder of claim 13, wherein the ball bush is press-fitted into the bar through-hole of the moving block.

* * * * *